(12) United States Patent
Tsutsumi

(10) Patent No.: US 8,970,918 B2
(45) Date of Patent: Mar. 3, 2015

(54) DOCUMENT MANAGEMENT SYSTEM AND METHOD THEREOF

(75) Inventor: Masami Tsutsumi, Kanagawa (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 179 days.

(21) Appl. No.: 13/220,503

(22) Filed: Aug. 29, 2011

(65) Prior Publication Data
US 2012/0069408 A1 Mar. 22, 2012

Related U.S. Application Data

(60) Provisional application No. 61/384,676, filed on Sep. 20, 2010.

(51) Int. Cl.
| | | |
|---|---|---|
| H04N 1/04 | (2006.01) |
| G06K 15/00 | (2006.01) |
| G06K 1/00 | (2006.01) |
| H04N 1/40 | (2006.01) |
| G06K 9/00 | (2006.01) |
| G06F 17/30 | (2006.01) |
| G06K 9/20 | (2006.01) |

(52) U.S. Cl.
CPC ........ *G06F 17/30011* (2013.01); *G06K 9/2063* (2013.01)
USPC ........... 358/474; 358/1.14; 358/1.9; 358/448; 382/100

(58) Field of Classification Search
USPC ............ 358/463, 3.28, 296, 1.9, 1.8, 1.5, 1.2, 358/1.18, 1.17, 1.15, 1.14, 1.13, 1.1; 347/220, 197
See application file for complete search history.

(56) References Cited

U.S. PATENT DOCUMENTS

| | | | | |
|---|---|---|---|---|
| 2007/0188823 | A1* | 8/2007 | Koide | 358/448 |
| 2008/0239351 | A1* | 10/2008 | Yada | 358/1.9 |
| 2008/0298631 | A1* | 12/2008 | Nishida | 382/100 |
| 2012/0314242 | A1* | 12/2012 | Kakutani | 358/1.14 |

FOREIGN PATENT DOCUMENTS

| | | |
|---|---|---|
| JP | 2004-228739 | 8/2004 |
| JP | 2010-146335 | 7/2010 |

* cited by examiner

*Primary Examiner* — Tammy Pham
*Assistant Examiner* — Frantz Bataille
(74) *Attorney, Agent, or Firm* — Patterson & Sheridan, LLP

(57) ABSTRACT

A document management system including a two dimensional code region detection portion that detects a two dimensional code region included in image data, obtained by scanning a document to be managed; a two dimensional code decoding portion that decodes document management information included in the two dimensional code; a layout analysis portion that analyzes a layout of the document; a low resolution portion that obtains data in which a background image becomes low resolution; a two dimensional code character and background processing portion that changes the content of the document; a two dimensional code character encoding portion that encodes the two dimensional code; a background encoding portion that encodes data of the background image; a document filing portion that generates a document file; and a file management portion that adds document management information, decoded by the two dimensional decoding portion, to the document file formed by the document filing portion.

13 Claims, 5 Drawing Sheets

DOCUMENT MANAGEMENT SYSTEM AND METHOD THEREOF

CROSS-REFERENCE TO RELATED APPLICATION

This application is based upon and Claims the benefit of priority from U.S. Provisional Application No. 61/384,676 filed on Sep. 20, 2010; the entire contents of which are incorporated herein by reference.

FIELD

Exemplary embodiments described herein relate to a data management system of a document and a method thereof in which two dimensional code such as a QR code (trademark) is attached.

BACKGROUND

In the related art, a management system of a document that inputs document management information in a two dimensional code such as a QR code and prints the QR code on the target document is widely known.

In this type of a scan document management system, in general, data in the QR code portion is transmitted to a server side through a network, is decoded through software to obtain management information and is managed by associating with the document data thereof. In addition, in other systems, there is a system that processes the data of the scanned document and performs automatic preparation of file names and automatic categorizing of folders by the QR code using application software of one server.

However, in addition to the document data, since QR code region detection and decoding of the QR code are performed by the software in for both systems, there are various limitations, for example, it takes a long time, large amounts of data cannot be processed in one time, decoding a plurality of QR codes is difficult or the QR code acts only for a designated location.

The exemplary embodiment provides a document management system and a method thereof that can perform the decoding after the document including a two dimensional code such as a QR code is scanned and the region of the two dimensional code is automatically and promptly detected and associated to the document data.

DETAILED DESCRIPTION

According to an exemplary embodiment, there is provided a document management system that includes a two dimensional code region detection portion that detects a two dimensional code region which is included in image data that is obtained by scanning a document to be managed; a two dimensional code decoding portion that decodes document management information included in the two dimensional code that is detected by the two dimensional code region detection portion; a layout analysis portion that analyzes a layout of the document; a low resolution portion that obtains data in which a background image, obtained from the document, is made to be low resolution; a two dimensional code character and background processing portion that changes the content of the document regarding the output of the two dimensional code region detection portion, the layout analysis portion and the low resolution portion and characters included in the document; a two dimensional code character encoding portion that encodes the two dimensional code included in the output of the two dimensional code character and background processing portion and the data of the characters; a background encoding portion that encodes data of the background image included in the output of the two dimensional code character and background processing portion; a document filing portion that generates a document file on the basis of the output of the two dimensional code character encoding portion and the background encoding portion; and a file management portion that adds document management information, decoded by the two dimensional code decoding portion, to the document file formed by the document filing portion.

Figure 1:
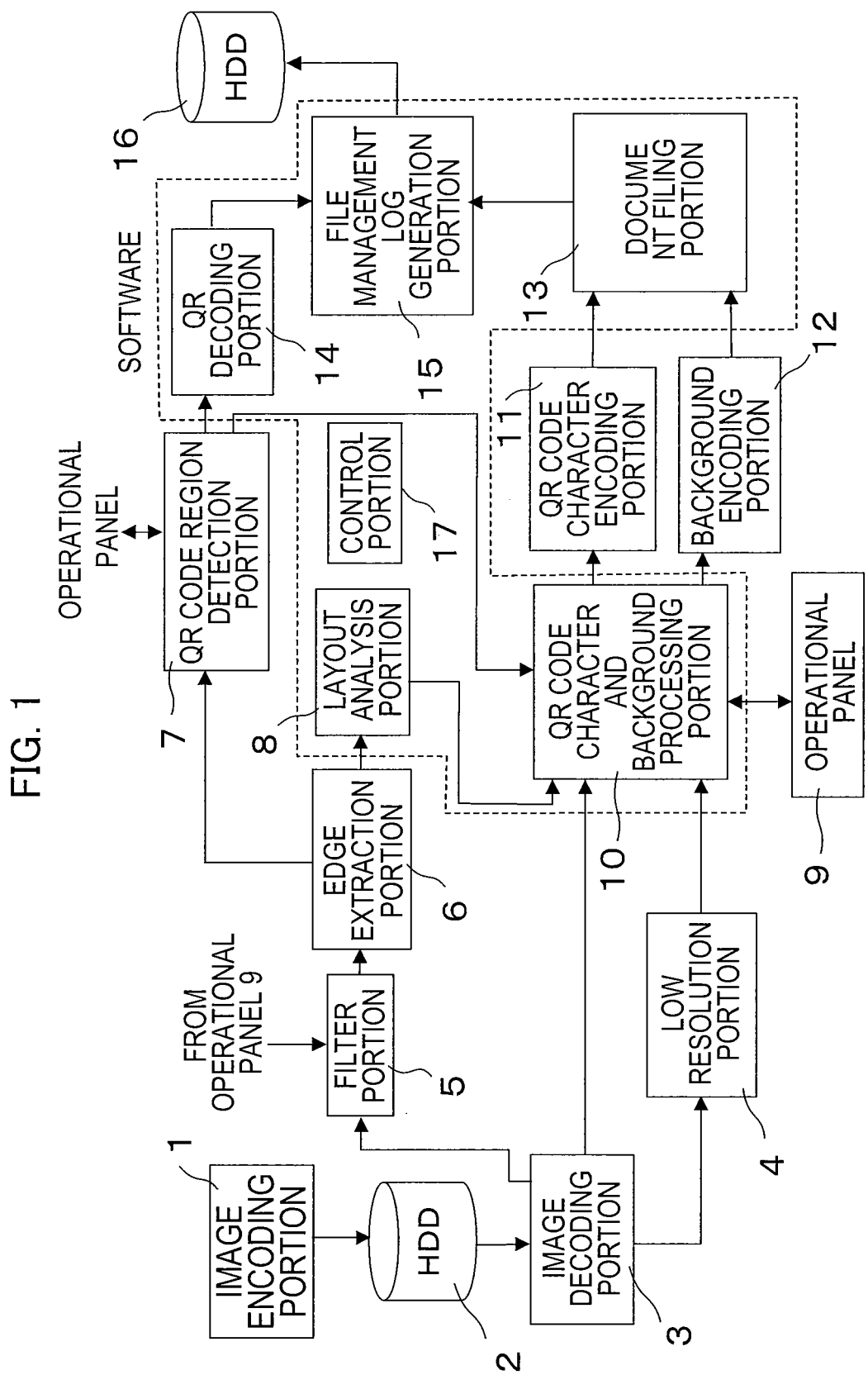
FIG. 1 is a diagram illustrating a configuration example of a document management system of an embodiment.

Hereinafter, the embodiment will be described with reference to the drawings. A configuration example of the embodiment is illustrated in FIG. 1.

A document data management system according to the embodiment is a system that forms and manages a document in a high compressed Portable Document Format (PDF) form and is also a Multi Function Peripheral (MFP).

This system includes an image encoding portion 1 that encodes the scanned image after the document is scanned by a scanner, a hard disk driving portion 2 (HDD) that temporarily stores the encoded image, an image decoding portion 3 that decodes the encoded image data, stored in the hard disk driving portion 2, a low resolution portion 4 that makes the decoded image of the image decoding portion 3 low resolution in order to compress it, a filter portion 5 that performs digital filtering on the decoded image of the image decoding portion 3, an edge extraction portion 6 that extracts an edge of the filtered image, a QR code region detection portion 7 that extracts the QR code region from the image in which the edge extraction is performed, a layout analysis portion 8 that analyzes the layout from the image in which the edge extraction is performed, a QR code character and background processing portion 10 that performs a variety of processes such as selecting the image by the instruction from an operational panel 9 that receives the output of the image decoding portion 3, the low resolution portion 4, the QR code region extraction portion 7 and the layout analysis portion 8, a QR code character encoding portion 11 that encodes the QR code and the characters from the image output from the QR code character and background processing portion 10, a background encoding portion 12 that encodes the background of the image output from the QR code character and background processing portion 10, a document filing portion 13 that performs filing by combining the encoded QR code and the characters output from the QR code character encoding portion 11 and the encoded background by the background encoding portion 12, a QR code decoding portion 14 that decodes the QR code of the region extracted in the QR code region detection portion 7, a file management log generation portion 15 that associates the decoded QR code information by the QR decoding portion 14 with the generated file by the document filing portion 13 as additional information, a hard disk driving portion (HDD) 16 that stores the file which is associated with the QR code information and a control portion 17 that controls overall processes.

In the embodiment, the layout analysis portion 8, the QR code character and background processing portion 10, the document filing portion 13, the QR code decoding portion 14, and the file management log generation portion 15 are complicated and have many branches, therefore, these are processed through the software under the control of the control portion 17.

In addition, the remaining image encoding portion 1, the image decoding portion 3, the low resolution portion 4, the filter portion 5, the edge extraction portion 6, the QR code region detection portion 7, the QR code character encoding portion 11, and the background encoding portion 12 are simple; however there are many repeated processes, therefore, these processes are configured to a pipeline process as hardware. Each of the portions can be operated using, for example, a Dynamic Reconfigurable Processor (DRP). When the DRP is used, there is an advantage in that overall configuration can be made simpler.

In the image encoding portion 1, binary image data can be obtained by scanning the original document by a scanner and the data is encoded, transmitted to the hard disk driving portion 2, and subsequently stored.

Figure 5:
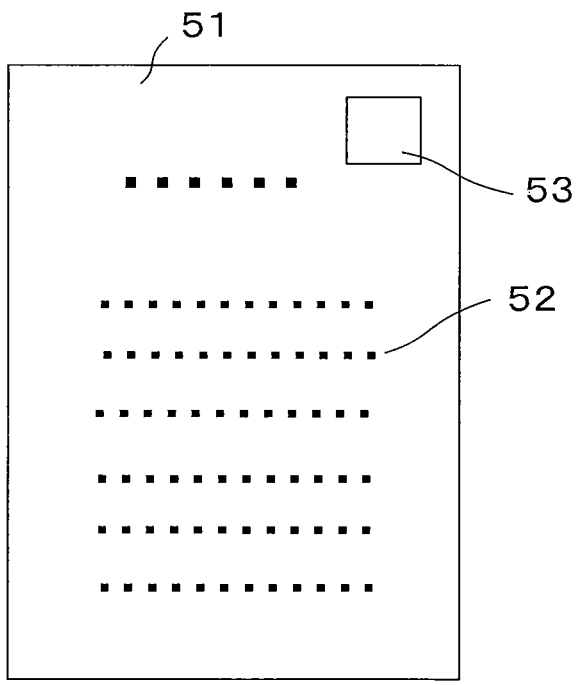
FIG. 5 is a diagram illustrating an example of a document used in an embodiment.

Here, an example of the document where subsequent processes are performed is shown in FIG. 5. In a document 51, a sentence 52 is recorded on a sheet of paper of a predetermined size and a QR code 53 is printed somewhere thereon. Generally, it is single-side printing. There are some cases where drawings are included in the document 51. The document may consist of one sheet and may consist of a plurality of sheets of paper. In general, in this case, the QR code is printed on a first page. The QR code may be printed on the next page. When the amount of the document management data is large, the QR code can be printed by being divided into plural pieces on the first page or on plural pages.

In QR code, even though the document management information such as filing numbers, names, categories, formation date and time which are generally printed on the document is induced, the other information can be included as well. The QR code 53 printed on the document 51 is printed in a portion where the sentence on the initial page is not recorded. There is also a case where a plurality of QR codes are printed.

The encoding of the image encoding portion 1 is capable of reversibly decoding without reducing the resolution.

The encoded original document which is temporarily stored in the hard disk driving portion 2 is decoded in the image decoding portion 3.

Figure 2:
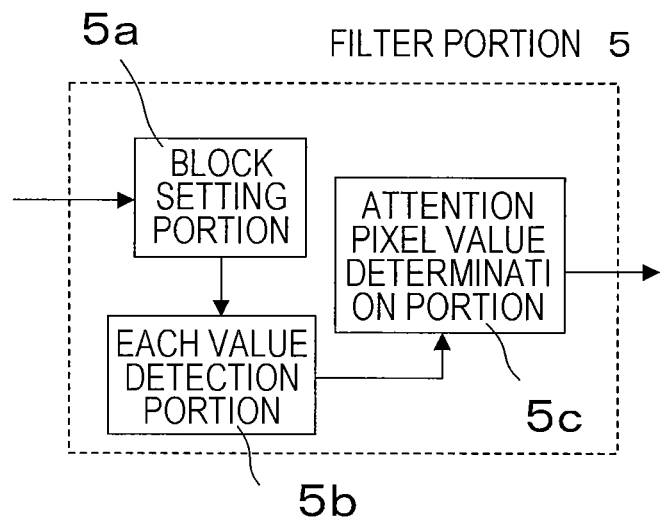
FIG. 2 is a diagram illustrating a configuration example of a filter according to the embodiment.

The decoded document is input to the filter portion 5. In the filter portion 5, noise is eliminated by a digital filter and for example, the filter portion 5 is configured as shown in FIG. 2.

The filter portion 5 is configured of each region of the image output from the image decoding portion 3 such as a block setting portion 5a that sets a region (block) of a 9 pixel of a 3×3 matrix, each value detection portion 5b that detects values of the 9 pixel of the block and an attention pixel value determination portion 5c that determines a fifth value of the values of the 9 pixel as a value of the attention pixel of the 3×3 matrix. In such a filter portion 5, the noise of the image obtained from the image decoding portion 3 is eliminated by repeating the setting of the value of the attention pixel of the predetermined region while shifting the region.

The image in which the noise is eliminated is converted into the data of the gray scale image from color image data and in the edge extraction portion 6, the edge extracting that detects an outline of white and black on the document is performed. The edge processed image is binarized and becomes a monochrome image. In the QR code region detection portion 7, the region of the QR code is detected on the basis of the monochrome image. The QR code includes a pointed symbol of three points and the data included in the region is read by assuming the pointed symbol as a reference coordinate (finding point). The region and the size of the QR code are detected by the position of the pointed symbol. The data in the region is read in the QR code decoding portion 14.

On the other hand, the document in which the edge extraction is processed in the edge extraction portion 6 is analyzed the layout thereof in the layout analysis portion 8. Since the process of the layout analysis portion 8 is performed through the software process and the process of the QR code region detection portion 7 is processed through the hardware process, both processes are performed in parallel.

In addition, the image of the document decoded in the image decoding portion 3 becomes an image of low resolution in the low resolution portion 4. The image low compressed in the low resolution portion 4, the image decoded in the image decoding portion 3, the information of the QR code region which is detected in the QR code region detection portion 7 and the information of the layout which is analyzed in the layout analysis portion 8 are input to the QR code character and background processing portion 10.

Figure 3:
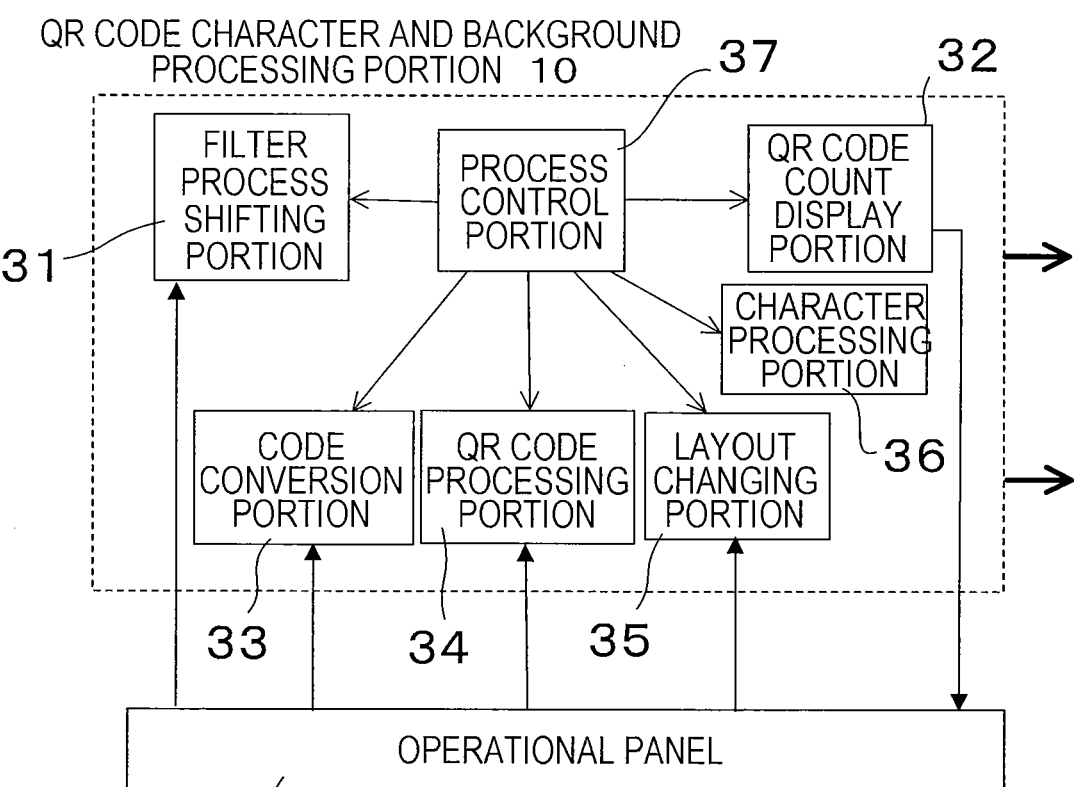
FIG. 3 is a diagram illustrating a configuration example of a QR code character and background processing portion according to the embodiment.

A configuration example of the QR code character and background processing portion 10 is shown in FIG. 3. The QR code character and background processing portion 10 is configured of a filter process shifting portion 31 that determines whether to perform the process of the filter portion 5 or not, a QR code count display portion 32 that counts the number of the QR code in the document which is detected in the QR code region detection portion 7 and displays the counting number on the operational panel 9, a code conversion portion 33 that converts the QR code into other two dimensional code, a QR code processing portion 34 that determines whether to eliminate the QR code detected in the QR code region detection portion 7 and further to process at the high resolution, a layout changing portion 35 that changes the layout such as the position of the QR code in the document, a character processing portion 36 that performs the process regarding the characters included in the image data, and a process control portion 37 that controls each portion. The character processing portion 36 extracts the characters from the image data which is transmitted from the image decoding portion 3 and the characters are processed in the QR code character and background processing portion 10.

The QR code character and background processing portion 10 is connected to the operational panel 9 and the number of the QR codes, counted by the QR code count display portion 32, is displayed on a screen of the operational panel 9 which will be described later. Meanwhile, in the filter process shifting portion 31 of the QR code character and background processing portion 10, the code conversion portion 33, the QR code processing portion 34 and the layout changing portion 35, a control signal is input from the operational panel 9. The operational panel 9, for example, is configured of a touch panel display and operators can perform an instruction with a finger or a pen.

Figure 4:
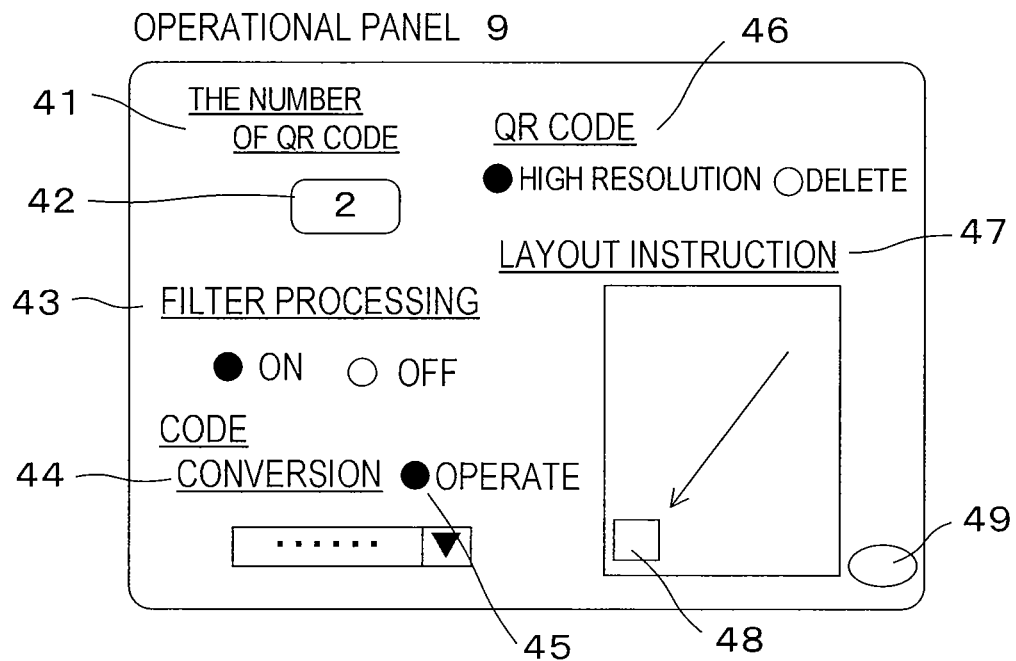
FIG. 4 is a diagram illustrating a configuration example of an operational panel according to the embodiment.

A display example of the operational panel 9 is shown in FIG. 4. In a display surface 42 of a field 41 of the number of the QR code of the operational panel 9, the number, in which the display is instructed, counted in the QR code count display portion 32, for example, 2 is displayed. In the field 43 of the filtering of the operational panel 9, the state of ON or OFF is displayed and either of the states is selected. When there is not much noise in the document and the OFF state is selected, the filter portion 5 shown in FIG. 1 does not function and the image in the document transmitted from the image decoding portion 3 is transmitted to the edge extraction portion 6 as it is. When the state ON is selected in the field 34 of the filtering, the noise is eliminated after the filtering of the image as described above. The state of ON or OFF is set to be selected in advance as an initial value.

A button 45 is displayed in a field 44 of the code conversion of the operational panel 9 and when the button is selected, other code in which the QR code is converted is set to be displayed and selected. For example, PDF417, Data Matrix, Maxi Code or the like which is a similar two dimensional overseas code type and patterns and one dimensional code can be selected. When the change from the QR code to other code is instructed, the code conversion portion 33 shown in FIG. 3 receives a conversion control signal and performs the code conversion process.

In a field 46 of the QR code of the operational panel 9 shown in FIG. 4, buttons for high resolution and elimination are displayed. The button for the high resolution is a button to add the QR code 53 made to be further high resolution and the button for the elimination is a button to eliminate the QR code 53. The elimination of the QR code is performed by painting the region with the background image in the QR code of the data of the background image.

Furthermore, in a field 47 of the layout instruction of the operational panel 9, a rectangle shows an image is displayed, for example, and the instruction to move the QR code to the position of 48 can be performed. If the QR code is detected in a plurality of sheets of document, the pages are displayed in order. It is possible to display a specific page in the field 47 of the layout display of the operational panel 9.

When an execution button 49 is touched, the instruction for the process in the operational panel 9 is transmitted to the QR code character and background processing portion 10. The control signal of the layout change is transmitted to the layout changing portion 35 shown in FIG. 3 and the layout is changed here.

In the QR code character encoding portion 11 in FIG. 1, the QR code and the characters which are processed in the QR code character and background processing portion 10 described above are encoded. As for the binary data, reversible encoding such as MMR, run length, JBIG2 is performed and as for the image data, the encoding such as JPEG, JPEG 2000 and HD-PHOTO is performed.

On the other hand, the background image in which the low resolution is performed in the low resolution portion 4 is input to the background encoding portion 12 via the QR code character and background processing portion 10 and is encoded. Accordingly, the data amount of the background image obtained in the background encoding portion 12 is still smaller compared to the data amount of the image decoded in the image decoding portion 3.

The document filing portion 13 transmits the data to the file management log generation portion 15 by mapping the encoding data obtained in the QR code character encoding portion 11 and the encoding data obtained in the background encoding portion 12.

Meanwhile, in the QR code decoding portion 14, the document management data included in the QR code is decoded and transmitted to the file management log generation portion 15.

The file management log generation portion 15 generates a file log by associating the QR code character encoding data and the background encoding data, transmitted from the document filing portion 13 and the corresponding document management data which is decoded in the QR decoding portion 14 and stores the file log in the hard disk driving device 16.

Next, operation of the embodiment will be described on the basis of a flowchart in FIG. 6. The encoding image data of the document, which is temporarily stored in the hard disk driving portion 2 shown in FIG. 1, is output in Act 601 and transmitted to the image decoding portion 3, configured of DRP, for example. In Act 602, the encoding image data is decoded in the image decoding portion 3.

In Act 603, it is detected whether to operate the filtering or not in the filter portion 5. In the filter portion 5, whether to perform the filtering is instructed by the operators on the operational panel 9 shown in FIG. 4. If the filtering is detected in Act 603, the filter portion 5 performs the filtering in Act 604.

When the filtering is not selected in the filter portion 5 or when the filtering is completed, the edge extraction of the image data is performed in the edge extraction portion 6 in Act 605. A color image can be obtained until the filtering; however, then the image is converted to the gray scale image data and the edge extraction is performed. The gray scale image data in which the edge extraction is performed is converted into the monochrome image data of the binarization in Act 606. The process is performed as an additional process in the edge extraction portion 6.

Subsequently, in the QR code region detection portion 7, the hardware process is performed; however, in parallel, in the layout analysis portion 8, the software process is performed. In the QR code region detection portion 7, the QR code searches the printed region and if the QR code is detected in Act 608, the QR code displays the number of the detected QR codes in Act 609 on a display surface 42 of the operational panel 9 shown in FIG. 4. In Act 610, a coordinate (finding point) of a starting point of the QR code and a size of the QR code are detected.

On the other hand, when the QR code is not detected in Act 608 or when the process in Act 610 is completed, in Act 611, the resolution of the background image is reduced in the low resolution portion 4 and after the data amount is reduced, the data is transmitted to the QR code character and background processing portion 10.

Meanwhile, the image data in which the edge extraction is performed in the edge extraction portion 6 is transmitted to the QR code region detection portion 7 and is simultaneously transmitted to the layout analysis portion 8 to be performed in parallel. Subsequently, the layout analysis is performed in Act 612. The result of the layout analysis is transmitted to the QR code character and background processing portion 10 and the characters, the QR code region and the background image are extracted in Act 613. As for the QR code, the designated process in a field 46 of the QR code of the operational panel 9 shown in FIG. 4 is performed.

In Act 614, in the QR code character encoding portion 11, the QR code or the data of the characters are encoded and next, in Act 615, in the background encoding portion 12, the data of the background image is encoded. These Acts 614 and 615 are processed through the hardware.

In parallel to the hardware process, as for the software process in Act 616, the QR code detected in advance is decoded in the QR code decoding portion 14 and the information such as the corresponding document management information included in the QR code is obtained.

Next, in Act 617, the QR code and the characters which are obtained and encoded in the QR code character encoding portion 11 and the encoded data of the background image obtained in the background encoding portion 12 are filed in the document filing portion 13.

In Act 618, the information of the QR code, decoded in the QR code decoding portion 14, is added to the document file, formed in the document filing portion 13 and the file management log is generated.

Next, in Act 619, the filing information management information is added to the document file and is transmitted to the hard disk driving device 16. As for the file management function, since the file management log is generated, the management of the file generation history can be easily performed.

Figure 6:
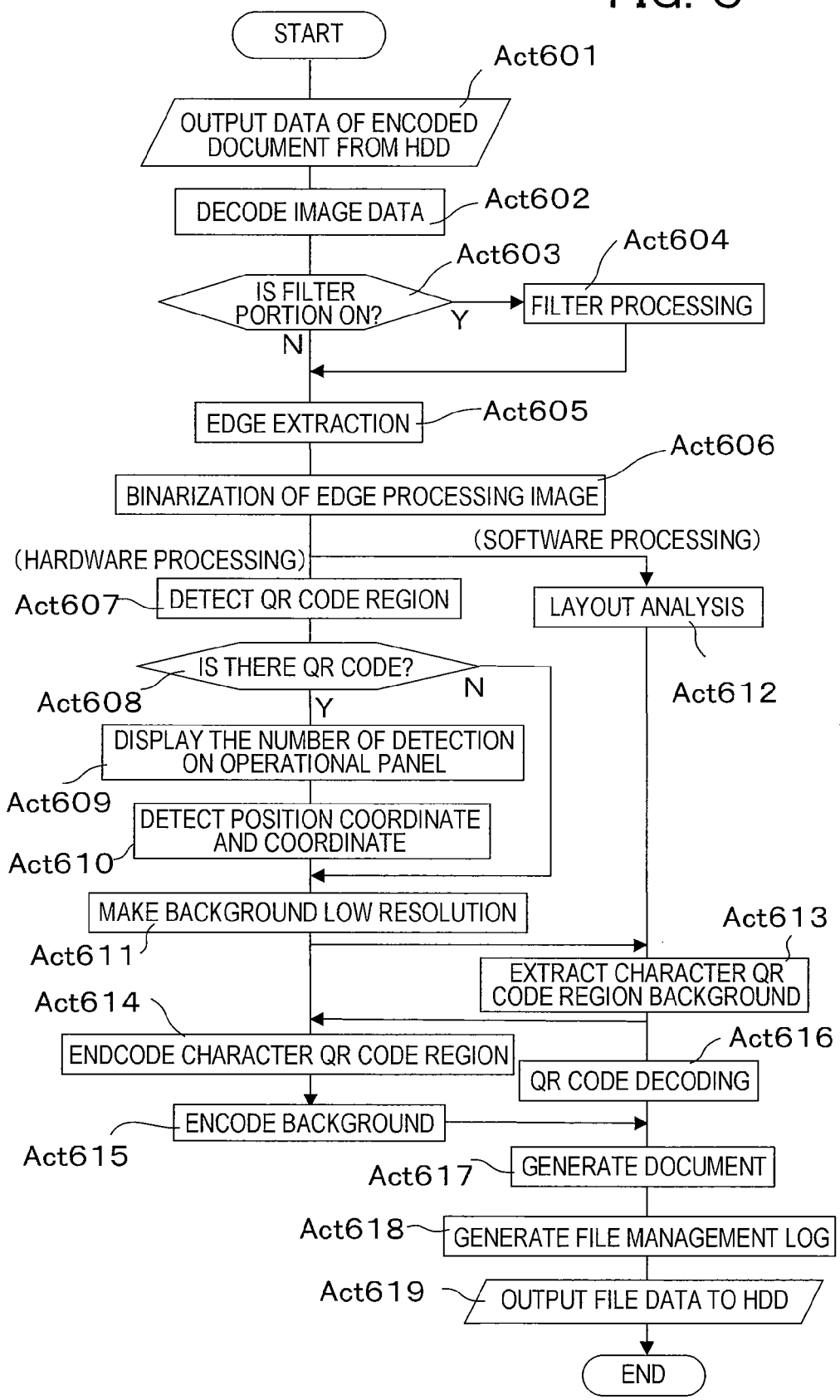
FIG. 6 is a diagram illustrating a flowchart for explaining operation of the embodiment shown in FIG. 1.

As shown in FIG. 6, the hardware processes of the QR code region detection portion 7 and the low resolution portion 4 from Act 607 to Act 611 are performed in parallel to the software process of the layout analysis in Act 612. The hardware processes of the QR code character encoding portion 11 and the background encoding portion 12 in Acts 614 and 615 and the software process of the QR decoding portion 14 in Act 616 are performed in parallel.

As described above, since the processes in the middle of the operation are performed in the hardware process and the software process while being parallel to each other, all of the processes can be promptly performed.

Figure 7A:
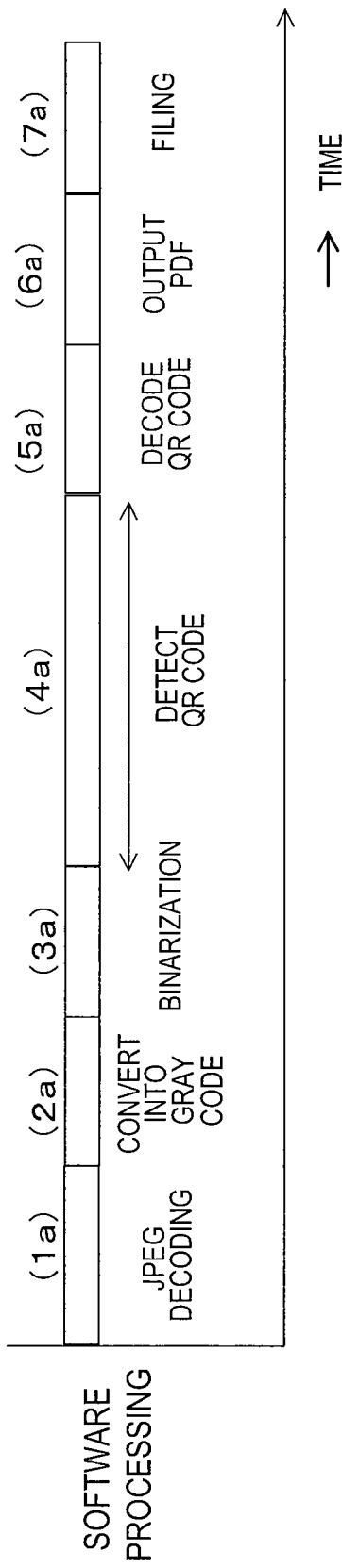
FIG. 7A is a diagram for illustrating a process when document management of the related art is performed.
Figure 7B:
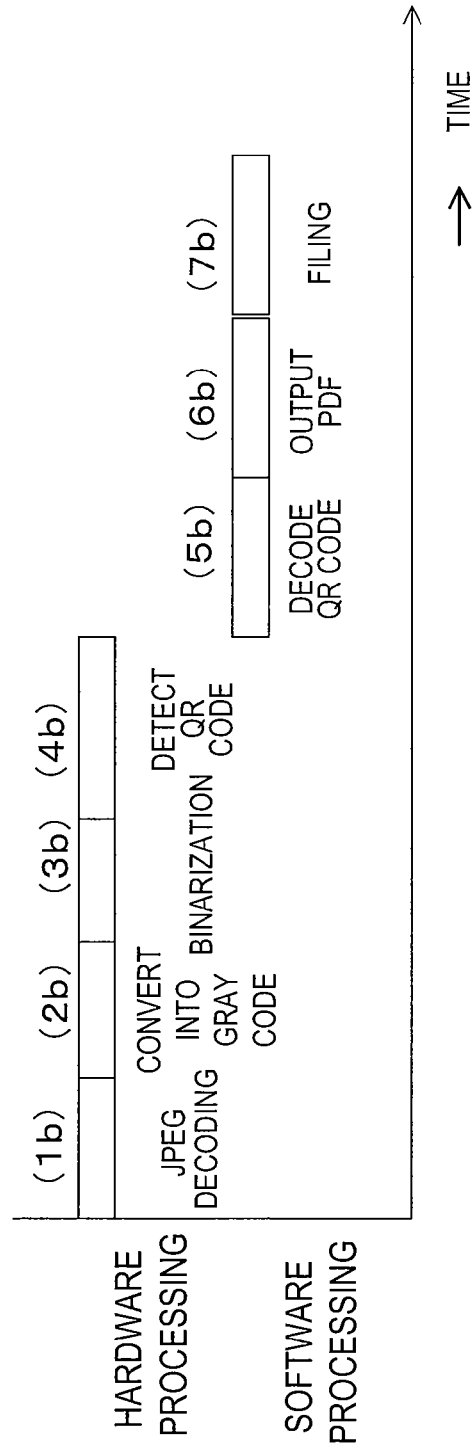
FIG. 7B is a diagram illustrating the process of the document management system shown in FIG. 1 in comparison with FIG. 7A.

The time need to process in comparison with the case of the related art with examples of the QR code region detection and a time chart of the decoding process of the QR code according to the embodiment are illustrated in FIG. 7A and FIG. 7B. A horizontal axis indicates the time. In FIGS. 7A and 7B, in order to simply explain, a process that JPEG data of one page in which the QR code is simply added are input and the file is generated is illustrated. FIG. 7A shows a case of the related art in which all of the processes are performed through the software. The JPEG image is decoded (1*a*), becomes the gray scale image (2*a*), is binarized (3*a*) and the QR code is searched (4*a*). Then, the QR code is decoded (5*a*), is output as the PDF (6*a*) and the file is generated (7*a*).

When all of the processes are performed through the software, it takes a long time for the processes depending on the content and the state of the data or due to misrecognition. In particular, the searching of the QR code significantly varies depending on the content of the document and it takes an extremely long time.

FIG. 7B shows a case in which the same processes are performed as in the present embodiment. The JPEG image is decoded (1*b*), becomes the gray scale image (2*b*), is binarized (3*b*), and the QR code is searched (4*b*). Then, the QR code is decoded (5*b*), is output as the PDF (6*b*), and the file is generated (7*b*).

In this case, the processing from (1*b*) to (4*b*) is performed in the hardware processing and the processing from (5*b*) to (7*b*) is performed in the software processing.

In this case of the present embodiment, since a pipeline process is performed with respect to the whole page, the process time can be made nearly constant. In addition in the present embodiment, since the decoding of the QR code can be preformed during searching the QR code, it is further possible to reduce the process time.

In the above embodiment, the document in which the QR code is printed is described. However, the exemplary embodiment is not limited to a document in which the QR code is printed and can be applied to a document that includes similar codes used overseas. In general, the exemplary embodiment can be applied to a document which includes two dimensional code.

According to the embodiment described above, the document management system and the method thereof that the document which includes the two dimensional code is scanned, the two dimensional code is automatically and promptly decoded, and the decoded two dimensional code can be associated with the document data.

In the embodiment described above, the file log and the management log are formed by adding the document management information decoded in the QR code decoding portion to the document file formed in the document filing portion. However, the exemplary embodiment is not limited thereto and it is favorable that only the decoded document management information is added to the document file.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A document management system comprising:
a two dimensional code detection portion that detects a two dimensional code which is included in image data that is obtained by scanning a document to be managed;
a two dimensional code decoding portion that decodes document management information included in the two dimensional code that is detected by the two dimensional code detection portion;
a layout analysis portion that analyzes a layout of the document;
a low resolution portion that generates data in which a background image, obtained from the document, is made to be low resolution;
a two dimensional code character and background processing portion that changes the content of the document with respect to the output of the two dimensional code detection portion, the layout analysis portion and the low resolution portion, and characters included in the document;
an operational panel configured to instruct the two dimensional code character and background processing portion to process the two dimensional code detected by the two dimensional code detection portion according to a user input made on the operational panel;
a two dimensional code character encoding portion that encodes the two dimensional code and the data of the characters included in the output of the two dimensional code character and background processing portion;
a background encoding portion that encodes data of the background image included in the output of the two dimensional code character and background processing portion;
a document file generating portion that generates a document file on the basis of the output of the two dimensional code character encoding portion and the background encoding portion; and a file management portion that adds document management information, decoded by the two dimensional code decoding portion, to the document file formed by the document file generating portion, wherein the two dimensional code region detection portion, the low resolution portion, the two dimensional code character encoding portion and the background encoding portion are hardware elements, wherein the two dimensional code decoding portion, the layout analysis portion, the two dimensional code character and background processing portion, the document file generating portion and the file management portion are software elements implemented with a CPU, wherein the processes of the two dimensional code region detection portion and the low resolution portion and the processes of the layout analysis portion are performed in parallel by the corresponding hardware elements and by the CPU, respectively, and wherein the processes of the two dimensional code character encoding portion and the background encoding portion and the processes of the two dimensional code decoding portion are performed in parallel by the corresponding hardware elements and by the CPU, respectively.

2. The system according to claim 1,
wherein the operational panel is capable of instructing a deletion of the two dimensional code, detected by the two dimensional code detection portion.

3. The system according to claim 2,
wherein the two dimensional code character and background processing portion includes a layout changing portion, the layout changing portion configured to change the layout according to a move instruction of the two dimensional code.

4. The system according to claim 3,
wherein the two dimensional code character and background processing portion includes a code conversion portion, the code conversion portion configured to change the two dimensional code to other two dimensional code according to a converting instruction.

5. The system according to claim 4,
wherein the operational panel displays the number of two dimensional codes detected by the two dimensional code detection portion.

6. The system according to claim 5,
wherein the two dimensional code is a QR code.

7. A document management system, comprising:
a filter portion that performs digital filtering to image data obtained by scanning a document to be managed;
an edge extraction portion that performs edge extraction with respect to the image on which the filtering is performed by the filter portion;
a two dimensional code detection portion that detects the two dimensional code included in the image data which is processed by the edge extraction portion;
a two dimensional code decoding portion that decodes the document management information included in the two dimensional code that is detected by the two dimensional code detection portion;
a layout analysis portion that analyzes the layout of the document;
a low resolution portion that generates data in which a background image, obtained from the document, is made to be low resolution;
a two dimensional code character and background processing portion that changes the content of the document with respect to the output of the two dimensional code detection portion, the layout analysis portion and the low resolution portion, and characters included in the document;
an operational panel configured to instruct the two dimensional code character and background processing portion to process the two dimensional code detected by the two dimensional code detection portion according to a user input made on the operational panel;
a two dimensional code character encoding portion that encodes the two dimensional code and the data of the characters included in the output of the two dimensional code character and background processing portion;
a background encoding portion that encodes data of the background image included in the output of the two dimensional code character and background processing portion;
a document file generating portion that generates a document file on the basis of the output of the two dimensional code character encoding portion and the background encoding portion; and
a file management portion that adds document management information, decoded by the two dimensional code decoding portion, to the document file formed by the document file generating portion,
wherein the filter portion, the edge extraction portion, the two dimensional code detection portion, the low resolution portion, the two dimensional code character encoding portion and the background encoding portion are hardware elements,
wherein the two dimensional code decoding portion, the layout analysis portion, the two dimensional code character and background processing portion, the document file generating portion and the file management portion are software elements implemented with a CPU,
wherein the processes of the two dimensional code region detection portion and the low resolution portion and the processes of the layout analysis portion are performed in parallel by the corresponding hardware elements and by the CPU, respectively, and
wherein the processes of the two dimensional code character encoding portion and the background encoding portion and the processes of the two dimensional code decoding portion are performed in parallel by the corresponding hardware elements and by the CPU, respectively.

8. The document management system according to claim 7,
wherein the two dimensional code character and background processing portion includes a filter switching portion that switches whether to perform the filtering of the filter portion or not, a layout change portion that changes the layout analyzed by the layout analysis portion according to processing instructions from the operational panel, a two dimensional code processing portion that performs a deletion of the two dimensional code detected by the two dimensional code detection portion according to the processing instructions from the operational panel, and a code conversion portion that converts the two dimensional code according to the processing instructions from the operational panel.

9. The document management system according to claim 7,
wherein the two dimensional code character and background processing portion instructs the number of two dimensional codes detected by the two dimensional code detection portion to be displayed via the operational panel.

10. The document management system according to claim 9, wherein the two dimensional code is a QR code.

11. A document management method, comprising:
detecting a two dimensional code included in image data obtained by scanning a document to be managed;
decoding document management information included in the detected two dimensional code;
analyzing a layout of the document;
making a background image obtained from the document low resolution;
changing the content of the document with respect to at least the two dimensional code, analyzed layout and characters included in the document according to an instruction from an operational panel issued based on a user input made on the operation panel;
encoding the data of the background image by encoding the two dimensional code or the data of the characters included in the document in which the changing is performed;
generating a document file on the basis of the two dimensional code and the characters and the background image in which the encoding is performed; and
adding the decoded document management information to the formed document file,
wherein the detecting of the two dimensional code, the making of the background image to be low resolution, the encoding of the two dimensional code or the data of the characters and the encoding of the data of the background image are performed via hardware processes,
wherein the decoding the document management information included in the detected two dimensional code, the analyzing of the layout, the changing of the two dimensional code, the characters and the background, the generating of the document file, and the adding of the document management information to the document file are performed via software processes,
wherein the detecting the two dimensional code and the making the background image low resolution performed via the hardware processes are performed in parallel with the analyzing the layout of the document performed via the software processes, and
wherein the encoding of the two dimensional code or the data of the characters and the encoding the data of the background image performed via the hardware processes are performed in parallel with the decoding the document management information included in the detected two dimensional code performed via the software processes.

12. A document management method, comprising:
performing digital filtering to image data obtained by scanning a document to be managed;
performing edge extracting with respect to the image in which the filtering is performed;
detecting a two dimensional code included in the image data in which the edge extraction is performed;
decoding document management information included in the detected two dimensional code;
analyzing a layout of the document;
making a background image obtained from the document low resolution;
changing the content of the document with respect to at least the two dimensional code, analyzed layout and characters included in the document according to an instruction from an operational panel issued based on a user input made on the operation panel;
encoding the data of the background image by encoding the two dimensional code or the data of the characters included in the document in which changing is performed;
generating a document file on the basis of the two dimensional code and the characters and the background image in which the changing is performed; and
adding the decoded document management information to the formed document file,
wherein the filtering, the edge extracting, the detecting of the two dimensional code, the making of the background image to be low resolution, the encoding of the two dimensional code or the data of the characters and the encoding of the data of the background image are performed via hardware processes,
wherein the decoding the document management information included in the detected two dimensional code, the analyzing of the layout, the changing of the two dimensional code, the characters and the background, the generating of the document file and the adding of the document management information to the document file are performed via software processes,
wherein the detecting the two dimensional code and the making the background image low resolution performed via the hardware processes are performed in parallel with the analyzing the layout of the document performed via the software processes, and
wherein the encoding of the two dimensional code or the data of the characters and the encoding the data of the background image performed via the hardware processes are performed in parallel with the decoding the document management information included in the detected two dimensional code performed via the software processes.

13. The method, according to claim 12, wherein the two dimensional code is a QR code.

* * * * *